INVENTORS
LEO W. DAVIS
WILLIAM T. MOUNTS
BY RONALD C. KAMP
ATTORNEY

INVENTORS
LEO W. DAVIS
BY WILLIAM T. MOUNTS
RONALD C. KAMP
ATTORNEY

United States Patent Office 3,346,079
Patented Oct. 10, 1967

3,346,079
SPRING APPLIED EMERGENCY BRAKE DEVICE
Leo W. Davis, East Peoria, and William T. Mounts, Washington, Ill., assignors to Westinghouse Air Brake Company, a corporation of Pennsylvania
Filed Oct. 26, 1964, Ser. No. 406,391
12 Claims. (Cl. 188—170)

The present invention relates generally to brake devices for motor vehicles, and more particularly, to brake devices of the emergency type.

Heavy duty vehicles, especially those of the off-highway type, utilize air pressure to energize the operational brakes, i.e., those brakes usually provided at each of the vehicle's wheels which are used to slow or stop the vehicle during normal operation thereof. If there is a failure of air pressure due to the bursting of an air line or a malfunction of the compressor, the operational brakes will not function and such heavy vehicles become dangerous instrumentalities. Thus, some means must be provided for bringing the vehicle to a safe and sure stop, and further to assure that the vehicle will remain stationary when it is parked.

It is, therefore, an object of the present invention to provide an emergency brake device for a vehicle which will be applied automatically in the event of air pressure failure, and which is not associated with or dependent upon the braking system utilized during normal operation of the vehicle.

It is another object of this invention to provide a vehicular emergency brake device in which the braking effort is maximized and the wear characteristics or life of the brake is prolonged.

It is still another object of this invention to provide an emergency brake device which can be utilized to push-start a vehicle having an automatic transmission incorporated therein.

These and other objects and many of the attendant advantages of the present invention will become more readily apparent from a perusal of the following specification and the accompanying drawings, wherein.

Figure 1:
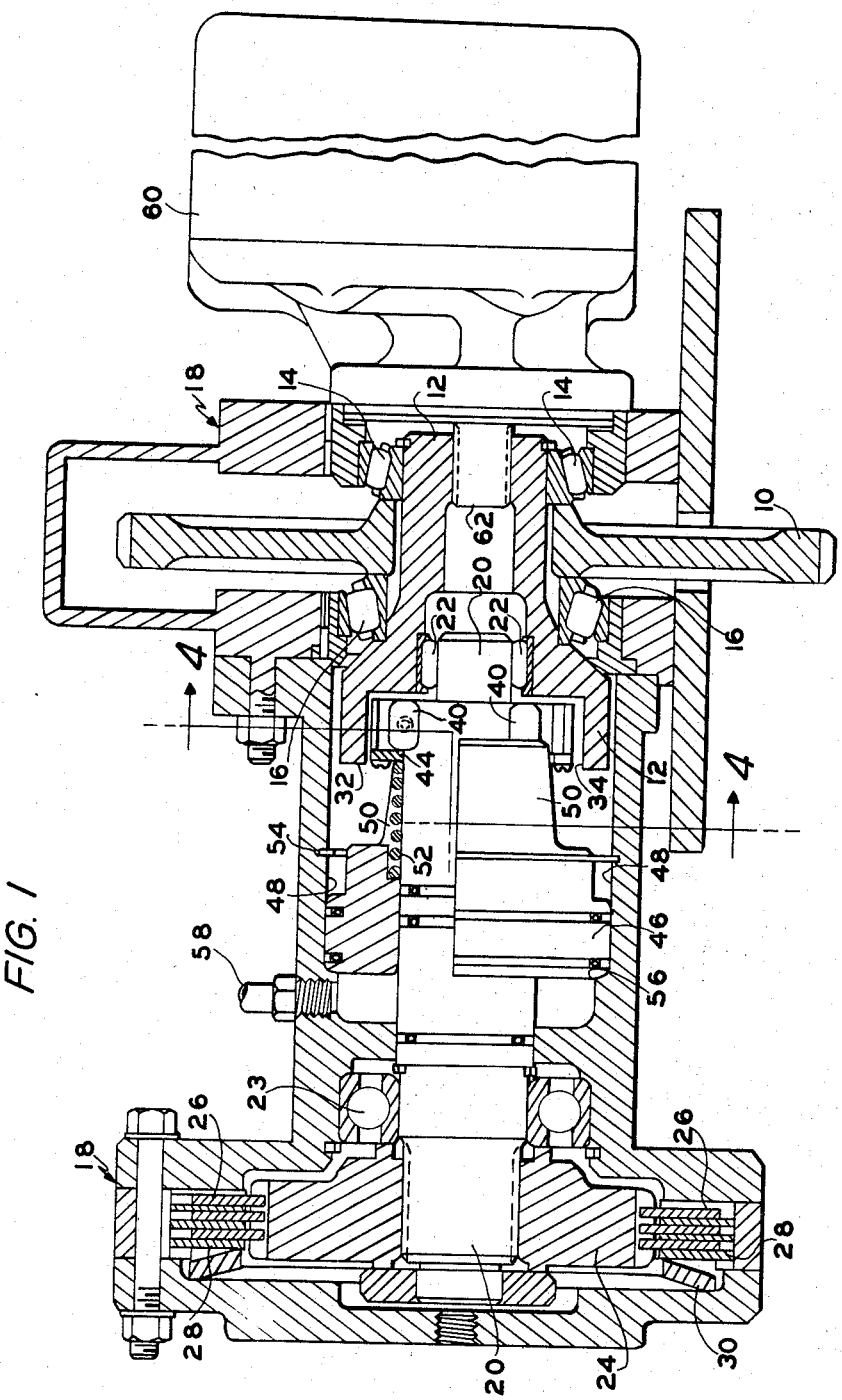
FIG. 1 is a side elevational view, partly in section, showing the assembled brake device.
Figure 2:
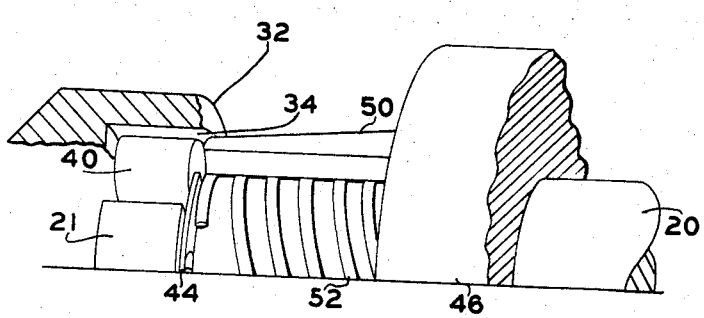
FIG. 2 is an isometric view with portions broken away, illustrating the actuating device in the brake-on position.
Figure 3:
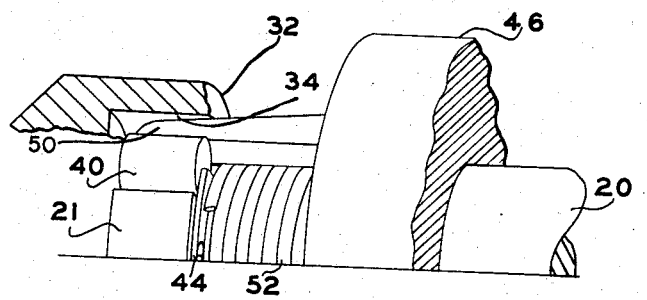
FIG. 3 is a view similar to FIG. 2 showing the position of the actuating device in the brake-off position.

Referring now in detail to the drawings, there is shown in FIG. 1 a gear 10 which is positively connected to one or more of the ground engaging wheels on a vehicle. In actual practice the gear 10 is in engagement with a gear, not shown, in the final drive unit of the vehicle. The gear 10 is splined to an adaptor hub 12 which is rotatably mounted on bearings 14 and 16 within a housing 18 affixed to the vehicle. A shaft 20 is also rotatably mounted within the housing 18 on bearings 22 and is rotatably supported at one end by bearings 23 carried by the adaptor hub 12. A flange or splined hub 24 is affixed to the opposite end of the shaft 20. A plurality of disk braking elements 26 is splined to the outer periphery of the splined hub 24 and a plurality of complementary disk braking elements 28 is splined to the housing 18. A flat Belleville type spring 30 is interposed between the braking elements and the vertical wall of the housing 18 and forces the braking elements 26 and 28 into tight frictional engagement.

Figure 4:
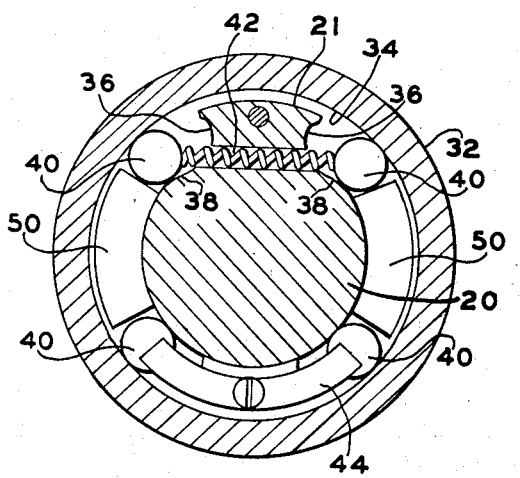
FIG. 4 is a cross-sectional view taken on line 4—4 of FIG. 1, with the housing omitted for clarity.

The adaptor hub 12 has an annular projection 32 formed integral therewith and defines a substantially cylindrical inner surface 34. The shaft 20 has an enlarged section 21 adjacent to and encompassed by the surface 34 on the adaptor hub 12 which, as best seen in FIG. 4, comprises four recesses 36 and an outwardly extending camming surface 38 associated with each recess 36. The recesses 36 and camming surfaces 38 are arranged in pairs with a roller 40 contained in each of the recesses. The rollers 40 of each pair are biased outward away from the recess 36 by a compression spring 42. The diameter of the rollers 40 is chosen so that each will wedge in the clearance provided between the shaft 20 and the surface 34 on the adaptor hub 12. Two plates 44 secured to the shaft 20 hold the rollers 40 within the confines of the adaptor hub 12 and the shaft 20. A piston 46 is slidable on the shaft 20 and within a cylinder 48 formed in the housing 18. A pair of axially extending fingers 50 is secured to the piston 46. Each of the fingers 50 is tapered with the narrow end adjacent to the rollers 40. When the piston is in its retracted position, i.e., moved to the left as viewed in FIG. 1, the width of each finger 50 is insufficient to permit contact with the rollers 40. However, when the piston is in its extended position, i.e., to the right as viewed in FIG. 1, the increased width of the fingers 50 will force the rollers 40 against the bias of the compression springs into the recesses 36. A compression spring 52 is positioned over the shaft 20 and between the piston 46 and the enlarged section 21 on the shaft 20, and urges the piston 46 toward its retracted position. A snap ring 54 secured within the cylinder 48 limits the forward travel of the piston 46 and a shoulder 56 formed in the cylinder 48 limits rearward movement. A conduit 58 is attached to the housing 18 and is in fluid communication with the cylinder 48. The conduit 58 is connected with the air system on the vehicle which is provided for the operational brakes. A valve, not shown, can be provided for closing off this conduit 58 from the air system and simultaneously permitting the pressure within the cylinder 48 to dissipate to the atmosphere.

A hydraulic pump 60 is attached to the housing and is driven by the adaptor hub 12 through a shaft 62 which is splined to the hub. The output from the pump 60 is directed to the clutches in a conventional automatic transmission of a type which requires a supply of hydraulic fluid under pressure for the transmission to be shifted out of its neutral position, e.g., a countershaft transmission as shown on pages 12 and 13 of The Co-Operator, 23, No. 6, copyrighted in 1961 by the LeTourneau-Westinghouse Company.

Operation

During normal operation of the vehicle, air under pressure is provided through the conduit 58 and into the cylinder 48. The air pressure will force the piston 46 to the right, as viewed in FIG. 1. The fingers 50 will be inserted to their maximum width between the rollers 40 and force the rollers into the recesses 36 against the bias of the springs 42. This will permit the adaptor hub 12 to rotate independently of the shaft 20. This with sufficient air pressure available, the shaft 20 will be held stationary by the constantly engaged braking elements 26 and 28, and allow the adaptor hub 12 and the gear 10 to rotate. Since the gear 10 is positively connected to the wheels, the wheels will also be permitted to rotate. However, if there is a complete failure of air pressure, or even a decrease in pressure to the point that the force exerted on the piston by the air pressure is less than the force exerted by the spring 52, the piston 46 will be moved to the left, as viewed in FIG. 1, and the fingers 50 will be withdrawn permitting the rollers 40 to become wedged between the surface 34 and the shaft 20. Because the rollers 40 are free to rotate only one of the two rollers in each pair will actually wedge between the surface 34 and the shaft 20. That is, if the adaptor hub 12 is rotating clockwise, as viewed in FIG. 4, each of the rollers 40 will also be rotated in a clockwise direction because of the frictional drag between the hub and each roller. This clockwise rotation of the rollers will cause the top right hand roller and the lower left hand roller to climb up the camming surface 38 associated therewith and become wedged between the surface 34 and the shaft 20. The top left hand roller and the bottom right hand roller will, because of their clockwise rotation, tend to roll into the recesses 36 associated therewith, even though the spring 42 tends to force them away from the recesses. These last-mentioned rollers will, therefore, not become wedged and will not contribute to the locking force between the adaptor hub 12 and the shaft 20. When the adaptor hub is rotated in a counterclockwise direction, as viewed in FIG. 4, a converse action will result, i.e., the top left hand and bottom right hand rollers will accomplish the locking function. Regardless of the direction of rotation, the adaptor hub 12 will attempt to rotate shaft 20 when the fingers 50 are withdrawn. The shaft 20 is, however, always being held against rotation by the constantly engaged braking elements 26 and 28. This braking effort will be transmitted through the gear 10 to the final drive and to the wheels. While an emergency stop of this type may completely ruin or severely damage the braking elements, the desired result of bringing the vehicle to a stop will be accomplished, and the braking elements can thereafter be replaced, if needed.

Even during normal operation of the vehicle, it is often desirable or necessary to leave the vehicle unattended or park it. In such a case it is not desirable to utilize the operational brakes applied by air pressure, because gradual loss of air would eventually result in the vehicle having no braking effort whatever. It is, therefore, very desirable to incorporate a valve, of a type well known in the art, to isolate conduit 58 from the air system and simultaneously vent the cylinder 48 to atmosphere. When this is done, the brake will be applied in the same manner as when there is a malfunction in the air system.

The hydraulic pump 60, which is driven by the adaptor hub, is hydraulically connected to the circuit which supplies hydraulic fluid to the fluid-actuated clutches in the transmission. When the engine on a vehicle equipped with such a transmission is not operating and cannnot be started by the means provided therefor, the present invention permits the engine to be started by pushing the vehicle, which otherwise would not be possible, in the following manner. Air pressure in the reserve air tank, if available, is directed through conduit 58 to release the brake. If there is no air pressure available on the vehicle, it can be supplied from an auxiliary source, e.g. the air supply on the pushing vehicle. As the disabled vehicle is pushed, the rotation of the wheels and the final drive will rotate the gear 10, and through the adaptor hub, rotate the pump 60. The output from the pump will provide hydraulic pressure to engage the selected clutches in the automatic transmission. The drive train from the wheels will turn over the engine through the engaged gears within the transmission, thereby permitting the disabled vehicle to be pushed-started.

The effectiveness of the emergency brake device will be maximized because the frictional elements, i.e. braking elements 26 and 28, are in constant engagement, and the braking effort, which is the product of the normal force provided by the Belleville spring 30 and the coefficient of friction of the material, will be high because the coefficient of static friction is higher than the coefficient of sliding friction for those materials generally utilized for brake linings. In addition, the wear on the brake elements is minimized due to the fact that there is no relative rotation between the two sets of braking elements when the brake device is not engaged.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. An emergency brake device for a vehicle having a plurality of ground engaging wheels and an operational braking system actuated by air pressure, comprising:
   an adaptor hub rotatably mounted on the vehicle and positively connected to at least one of said wheels,
   a shaft rotatably mounted on the vehicle and having one end in close proximity to said hub,
   a first braking member attached to the shaft,
   a second braking member non-rotatably mounted on the vehicle,
   resilient means urging said braking members into frictional engagement whereby said braking members are adapted to remain in frictional contact during vehicle movement,
   and means responsive to loss of said air pressure for operatively connecting said hub to the shaft.

2. An emergency brake device according to claim 1 and further comprising a hydraulic fluid pump connected to said hub whereby said pump is rotated in response to rotation of said hub and the output therefrom can be utilized to effect push starting of the vehicle.

3. An emergency brake device for a vehicle having a plurality of ground engaging wheels and an operational braking system actuated by a source of air under pressure, comprising:
   an adaptor hub rotatably mounted on the vehicle and positively geared to at least one of said wheels,
   a shaft frictionally retained against rotary movement mounted on said vehicle,
   the shaft having at least a pair of recesses and a radially extending cam surface associated with each of the recesses,
   a roller in each of the recesses,
   bias means for forcing the rollers outward onto said camming surfaces wherein the rollers are wedged between the shaft and said hub,
   and means slidable on the shaft for moving the rollers against the force of the bias means into the recesses in response to the application of air pressure from said source, and for allowing the rollers to wedge between the shaft and said hubs in response to removal of said air pressure.

4. An emergency brake device according to claim 3 and further comprising a hydraulic pump connected to said hub.

5. An emergency brake device according to claim 3 wherein said means comprises:
   a cylinder formed around the shaft,
   a piston slidably mounted on the shaft and within the cylinder, and movable between a forward position and a retracted position,
   at least one axially projecting finger attached to the piston,
   said finger being shaped to force the rollers into the recesses when the piston is in the forward position and to allow the bias means to force the rollers outward onto said camming surfaces when the piston is in the retracted position,
   spring means for urging the piston to the retracted position,
   and conduit means for admitting air under pressure to the cylinder to force the piston to the forward position.

6. An emergency brake device for a vehicle having a plurality of ground engaging wheels and an operational braking system actuated by air pressure, comprising:
   an adaptor hub rotatably mounted on the vehicle and positively connected to at least one of said wheels, a shaft rotatably mounted on the vehicle and having one end in close proximity to said hub, a constantly engaged braking member secured to the vehicle and the shaft, a cylinder on the vehicle and encompassing at least a portion of the shaft, a piston slidable on the shaft and within the cylinder between a forward position and a retracted position, spring means for urging the piston to the retracted position, conduit means for admitting air under pressure to the cylinder to move the piston to the forward position, and means responsive to the position of the piston to operatively connect said hub to the shaft when the piston is in the retracted position and to permit said hub to rotate independently of the shaft when the piston is in the forward position.

7. An emergency brake device according to claim 6 and further comprising a hydraulic fluid pump connected to said hub whereby the output of said pump can be utilized to actuate the clutches in an automatic transmission and permit the vehicle to be push-started.

8. A mechanical coupling comprising:
a first member;
a second member rotatable relative to said first member;
roller means including at least one pair of adjacently positioned rollers carried by said second member in peripheral contact with said first member, said roller means forming the only driving connection between said first and second members;
wedge means carried by one of said members for wedging said roller means between said first and second members;
and axially movable disabling means contacting each of said rollers or said pair, said disabling means carried by one of said members selectively operable to positively hold said roller means out of wedging contact with said wedge means.

9. A mechanical coupling according to claim 8 including bias means urging said roller means into contact with said first member.

10. A mechanical coupling according to claim 8:
wherein said first member comprises a hub having an inner periphery;
said second member comprises a shaft extending internally of said hub;
said wedge means comprises a plurality of angularly spaced, radially extending cam surfaces on said shaft, said cam surfaces including angularly spaced high and low points;
said roller means includes a plurality of rollers, each roller being movably retained between said inner periphery of said hub and one of said cam surfaces; and
said disabling means operable to retain said rollers adjacent said low points of said cam surfaces.

11. A mechanical coupling according to claim 10 wherein said disabling means comprises a plurality of tapered fingers mounted on said shaft for axial movement relative thereto between said rollers.

12. A mechanical coupling according to claim 10 further including bias means urging said roller means into contact with said inner periphery of said hub, said bias means comprising a helical spring interposed between each pair of said rollers.

References Cited
UNITED STATES PATENTS

| 2,001,668 | 5/1935 | Maier | 192—45 X |
| 2,754,947 | 7/1956 | Marsden | 188—82.84 X |
| 3,243,023 | 3/1966 | Boyden | 192—45 X |

DUANE A. REGER, *Primary Examiner.*